United States Patent
Wengler et al.

(10) Patent No.: US 8,319,684 B2
(45) Date of Patent: *Nov. 27, 2012

(54) METHOD AND APPARATUS FOR POSITION DETERMINATION WITH EXTENDED SPS ORBIT INFORMATION

(75) Inventors: Michael James Wengler, Carlsbad, CA (US); Leonid Sheynblat, Hillsborough, CA (US); Mark Leo Moeglein, Ashland, OR (US); Zoltan F. Biacs, San Mateo, CA (US); Arnold Jason Gum, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 203 days.

This patent is subject to a terminal disclaimer.

(21) Appl. No.: 12/366,546

(22) Filed: Feb. 5, 2009

(65) Prior Publication Data

US 2009/0315772 A1     Dec. 24, 2009

Related U.S. Application Data

(63) Continuation of application No. 11/833,962, filed on Aug. 3, 2007.

(60) Provisional application No. 60/939,964, filed on May 24, 2007, provisional application No. 60/917,622, filed on May 11, 2007, provisional application No. 60/896,493, filed on Mar. 22, 2007, provisional application No. 60/888,738, filed on Feb. 7, 2007, provisional application No. 60/886,230, filed on Jan. 23, 2007, provisional application No. 60/857,972, filed on Nov. 10, 2006.

(51) Int. Cl.
*G01S 19/27*     (2010.01)
*G01S 19/05*     (2010.01)

(52) U.S. Cl. .................... 342/357.66; 342/357.42
(58) Field of Classification Search ............ 342/357.13, 342/357.15, 357.42, 357.66
See application file for complete search history.

(56) References Cited

U.S. PATENT DOCUMENTS 5,323,322 A     6/1994     Mueller et al.
(Continued)

FOREIGN PATENT DOCUMENTS

EP     1215508 A1     6/2002
(Continued)

OTHER PUBLICATIONS

Feng, Y. et al.: "Representing GPS Orbits and Corrections Efficiently for Precise Wide Area Positioning," ION GNSS. International Technical Meeting of the Satellite Division of the Institute of Navigation, Washington D.C., US, Sep. 21, 2004, pp. 2316-2323, XP002413338.

(Continued)

*Primary Examiner* — Jack W Keith
*Assistant Examiner* — Cassie Galt
(74) *Attorney, Agent, or Firm* — Thien T. Nguyen

(57) ABSTRACT

A method and system for assisting mobile stations to locate a satellite use an efficient messaging format. A server computes a correction between coarse orbit data of a satellite and precise orbit data of the satellite. A coordinate system is chosen such that variation of the correction is substantially smooth over time. The server further approximates the correction with mathematical functions to reduce the number of bits necessary for transmission to a mobile station. The mobile station, upon receiving the coefficients, evaluates the mathematical functions using the coefficients and a time of applicability (e.g., the current time), converts the evaluated result to a standard coordinate system, and applies the conversion result to the coarse orbit data to obtain the precise orbit data.

12 Claims, 6 Drawing Sheets

U.S. PATENT DOCUMENTS

| | | |
|---|---|---|
| 5,731,786 A | 3/1998 | Abraham et al. |
| 5,731,787 A | 3/1998 | Sheynblat |
| 5,764,184 A | 6/1998 | Hatch et al. |
| 5,828,336 A | 10/1998 | Yunck et al. |
| 5,862,495 A | 1/1999 | Small et al. |
| 5,909,381 A | 6/1999 | Shome et al. |
| 5,963,167 A | 10/1999 | Lichten et al. |
| 6,058,338 A | 5/2000 | Agashe et al. |
| 6,085,128 A | 7/2000 | Middour et al. |
| 6,134,483 A | 10/2000 | Vayanos et al. |
| 6,211,819 B1 | 4/2001 | King et al. |
| 6,219,376 B1 | 4/2001 | Zhodzishsky et al. |
| 6,411,892 B1 | 6/2002 | van Diggelen |
| 6,424,890 B1 | 7/2002 | Syrjarinne et al. |
| 6,434,509 B1 | 8/2002 | Tsuchiya et al. |
| 6,453,237 B1 | 9/2002 | Fuchs et al. |
| 6,487,499 B1 | 11/2002 | Fuchs et al. |
| 6,542,820 B2 | 4/2003 | LaMance et al. |
| 6,560,534 B2 | 5/2003 | Abraham et al. |
| 6,583,916 B2 | 6/2003 | Carlson et al. |
| 6,587,789 B2 | 7/2003 | van Diggelen |
| 6,606,346 B2 | 8/2003 | Abraham et al. |
| 6,671,620 B1 | 12/2003 | Garin et al. |
| 6,683,564 B1 | 1/2004 | McBurney |
| 6,704,348 B2 | 3/2004 | Abraham et al. |
| 6,757,610 B1 | 6/2004 | Mann et al. |
| 6,798,377 B1 | 9/2004 | Lupash et al. |
| 6,829,535 B2 | 12/2004 | van Diggelen et al. |
| 6,853,916 B2 | 2/2005 | Fuchs et al. |
| 6,930,635 B2 | 8/2005 | Vayanos et al. |
| 7,019,689 B1 | 3/2006 | McBurney et al. |
| 7,053,824 B2 | 5/2006 | Abraham |
| 7,053,826 B1 | 5/2006 | McBurney et al. |
| 7,057,554 B2 | 6/2006 | McBurney |
| 7,123,190 B1 | 10/2006 | McBurney et al. |
| 7,142,157 B2 | 11/2006 | Garin et al. |
| 7,158,080 B2 | 1/2007 | van Diggelen |
| 7,548,200 B2 * | 6/2009 | Garin .................. 342/357.66 |
| 7,693,660 B2 * | 4/2010 | van Diggelen et al. ....... 701/226 |
| 2002/0102990 A1 | 8/2002 | Alberth, Jr. et al. |
| 2003/0008666 A1 | 1/2003 | Ohmura et al. |
| 2003/0176969 A1 | 9/2003 | van Diggelen |
| 2004/0077365 A1 | 4/2004 | Abraham et al. |
| 2004/0160360 A1 | 8/2004 | Jung et al. |
| 2005/0068229 A1 | 3/2005 | Moilanen et al. |
| 2005/0080561 A1 | 4/2005 | Abraham et al. |
| 2006/0082497 A1 | 4/2006 | Rotman et al. |
| 2006/0119505 A1 | 6/2006 | Abraham |
| 2006/0224317 A1 | 10/2006 | Sarkar |
| 2006/0290566 A1 | 12/2006 | Syrjarinne et al. |
| 2007/0200752 A1 | 8/2007 | Van Diggelen et al. |
| 2007/0247361 A1 | 10/2007 | Shoarinejad |
| 2007/0273581 A1 | 11/2007 | Garrison et al. |
| 2007/0299609 A1 | 12/2007 | Garin et al. |
| 2008/0079633 A1 | 4/2008 | Pon et al. |
| 2008/0088506 A1 | 4/2008 | Fischer |
| 2008/0111736 A1 * | 5/2008 | Han .................. 342/357.02 |
| 2008/0186228 A1 | 8/2008 | Garin et al. |
| 2009/0237302 A1 * | 9/2009 | Derbez et al. ............ 342/357.15 |
| 2009/0289849 A1 | 11/2009 | Baddini Mantovani |
| 2009/0295630 A1 | 12/2009 | Wengler et al. |
| 2010/0194634 A1 | 8/2010 | Biacs et al. |
| 2011/0102253 A1 | 5/2011 | Morrison |

FOREIGN PATENT DOCUMENTS

| | | |
|---|---|---|
| EP | 1852711 | 11/2007 |
| RU | 2161317 C1 | 12/2000 |
| RU | 2197780 C2 | 1/2003 |
| RU | 2213980 C2 | 10/2003 |
| TW | 200405026 | 4/2004 |
| TW | 200602657 | 1/2006 |
| WO | WO9838522 A1 | 9/1998 |
| WO | WO9919743 A1 | 4/1999 |
| WO | 2004099813 | 11/2004 |
| WO | 2006/031652 A2 | 3/2006 |

OTHER PUBLICATIONS

International Search Report, PCT/US2007/083501—International Search Authority—European Patent Office—Nov. 4, 2008.

Written Opinion, PCT/US2007/083501—International Search Authority—European Patent Office—Nov. 4, 2008.

Taiwan Search Report—TW096142583—TIPO—Feb. 16, 2011.

Milan Horemuz, et al., "Polynomial interpolation of GPS satellite coordinates"/ GPS Solutions, Springer, Berlin, DE, vol. 10, No. 1, Feb. 1, 2006, pp. 67-72, XP019357603 ISSN: 1521-1886 p. 69 right-hand-column.

Yanming Feng, et al., "Efficient interpolations to GPS orbits for precise wide area applications" GPS Solutions, Springer, Berlin, DE, vol. 9, No. 4, Nov. 1, 2005, pp. 273-282, XP019357648 ISSN: 1521-1886 the whole document.

"MATLAB Implementation," http://www.ngs.noaa.gov/gps-toolbox/Vium.htm, pp. 1-2.

* cited by examiner

METHOD AND APPARATUS FOR POSITION DETERMINATION WITH EXTENDED SPS ORBIT INFORMATION

RELATED APPLICATIONS

This application is a Continuation, and hereby claims the benefit of the filing date of U.S. patent application Ser. No. 11/833,962, filed Aug. 3, 2007, entitled "Method and Apparatus For Position Determination With Extended SPS Orbit Information," Ser. No. 11/833,962 claims the benefit of the filing date of U.S. patent application No. 60/857,972, filed Nov. 10, 2006, entitled "Bit Efficient Support Of Extended Orbit For GNSS," U.S. patent application No. 60/886,230, filed Jan. 23, 2007, entitled "Efficient Range Correction Messages For Accurate Position Determination With Assisted GPS," U.S. patent application No. 60/888,738, filed Feb. 7, 2007, entitled "Bit Efficient Support Of Extended Orbit For GNSS," U.S. patent application No. 60/896,493, filed Mar. 22, 2007, entitled "Method And Apparatus For Position Determination With Extended SPS Orbit Information," U.S. patent application No. 60/917,622, filed May 11, 2007, entitled "Method And Apparatus For Position Determination With Extended SPS Orbit Information," and U.S. patent application No. 60/939,964 filed May 24, 2007, entitled "Method And Apparatus For Position Determination With Extended SPS Orbit Information," all of which are hereby incorporated by reference in their entirety and are assigned to the assignee hereof.

BACKGROUND

1. Field

The present invention relates generally to a satellite positioning system (SPS), and more particularly, to assisting a mobile station to locate a satellite using an efficient messaging format containing extended SPS orbit correction information.

2. Background Information

A satellite positioning system (SPS) receiver normally determines its position by computing times of arrival of signals transmitted simultaneously from multiple satellites. These satellites transmit, as part of their messages, both satellite positioning data and satellite clock timing data. The satellite positions and clock timing typically are represented by almanac or ephemeris data. The ephemeris data provides an extremely accurate estimate (~1 meter error) of satellite positions and clock bias. However, the process of searching for and acquiring satellite signals, reading the ephemeris data transmitted by the satellites, and computing the location of the receiver from this data is time consuming, often requiring several minutes. In many cases, this lengthy processing time is unacceptable and, furthermore, greatly limits battery life in miniaturized portable applications.

For example, Global Positioning Systems (GPS) determine position based on the measurement of the times of arrival at a GPS receiver antenna of the GPS signals broadcast from orbiting satellites. As stated, one disadvantage of such a system is the relatively long time needed to perform signal acquisition under certain conditions. Satellite signals cannot be tracked until they have first been located by searching in a two-dimensional search "space", whose dimensions are code-phase delay and observed Doppler frequency shift. The process of an SPS receiver searching for, acquiring, and demodulating satellite signals is sometimes referred to as a "standalone" mode of operation, which can be contrasted with an "assisted" mode of operation.

In order to reduce the delay associated with a stand-alone mode of operation, information may be provided to aid an SPS or GPS receiver in acquiring a particular signal. Such assistance information permits a receiver to narrow the search space that must be searched in order to locate a signal, by providing bounds on the code and frequency dimensions. A system that employs a GPS receiver augmented with externally sourced GPS assistance data is commonly referred to as an "assisted global positioning system" (AGPS).

One example of an AGPS system includes a wireless mobile station (MS) (such as a cellular telephone) having, or in communication with, a GPS receiver, the MS in communication with one or more base stations (BSs), also referred to as base transmitting stations (BTSs) or node Bs, of a wireless communication network, which in turn communicate with one or more location assistance servers, sometimes referred to as Position Determination Entities (PDEs), Serving Mobile Location Centers (SMLCs), or the like, depending upon the communication air interface protocol. Another example of an AGPS system includes a MS or laptop, having, or in communication with, a GPS receiver, the MS or laptop capable of communication with a communication network, such as but not limited to, the Internet, through which the device ultimately communicates with a location assistance server.

The location assistance server derives GPS assistance information from one or more GPS reference receivers. The location assistance server also has access to a means of determining the approximate mobile station position. The location assistance server maintains a GPS database that contains reference time, satellite orbit almanac and ephemeris information, ionosphere information, and satellite working condition ("health") information. The location assistance server also computes the assistance information customized for the approximate mobile station position.

Position location for a MS in an AGPS system can be determined at the MS (sometimes referred to as MS-based positioning mode) with assistance from a location assistance server. During MS-based positioning mode, when a GPS engine requires updated aiding data such as ephemeris data, almanac data regarding the location of satellites or base stations, timing information for the base stations and/or satellites, or seed position (such as, but not limited to that determined by advanced forward link trilateration (AFLT)), and so on, the next position fix will result in the mobile station contacting the communication network for data, thereby taxing the network and using power resources of the MS. Position location for a MS in an AGPS system can alternatively be determined at the location assistance server and transmitted back to the MS using information acquired by the MS (sometimes referred to as MS-assisted positioning mode). Satellite orbits in a GPS can be modeled as modified elliptical orbits with correction terms to account for various perturbations. The relative short-term ephemeris data provides a very accurate representation of the orbit of the satellite. For example, bit 17 in word 10 of GPS subframe 2 is a "fit interval" flag which indicates the curve fit interval used by the GPS control segment in determining the ephemeris parameters with "0" indicating a 4-hour fit and "1" indicating a "greater than 4 hours" fit. Furthermore, the extended navigation mode of the Block II/IIA GPS satellites guarantees the transmission of correct ephemeris parameters for 14 days to support short-term extended operation. During normal operation, the control segment provides daily uploads of the navigation (orbital) data to each satellite to support a positioning accuracy of 16 meters spherical error probable (SEP).

As described, a location assistance server has accurate orbital information available. Each ephemeris and clock correction model uploaded by the location assistance server usually covers a 4-hour time span with great accuracy. To cover a longer period of time, such as a 24-hour period, the location assistance server could send the device multiple 4-hour ephemeris and clock correction models for each of the N satellites in the constellation. However, it would require a large amount of octets to describe the satellite positions and clock errors for full constellation of satellites (e.g. 27 satellites). These lengthy messages would contribute to the lengthy processing time and are, therefore, unacceptable to most mobile device applications. This would also tax the communication network.

In addition to ephemeris data, satellites in a SPS also transmit almanac data that can be used to determine satellite positions and clock bias. The almanac data provides a truncated reduced-precision (coarse) set of the ephemeris parameters as well as coarse clock correction parameters. Consequently, raw satellite positions derived from the almanac data tend to be much less accurate (~1 kilometer) than those derived from the detailed ephemeris data (~1 meter). It should be noted that in general, the satellite orbits can be represented either by a coarse set (e.g., the almanac) or a precise set (e.g., the ephemeris) of orbital and satellite clock parameters.

A system and method is needed to provide extended orbital data to an SPS receiver to reduce the frequency of almanac and/or ephemeris downloads required, either from the satellite directly, or from a location assistance server.

SUMMARY OF THE DESCRIPTION

A method and system for assisting mobile stations to locate satellites using an efficient messaging format is described. A server computes a correction between coarse orbit data of a satellite and precise orbit data of the satellite. A coordinate system is chosen such that variation of the correction is substantially smooth over time. The server further approximates the correction with mathematical functions to reduce the number of bits necessary for transmission to a mobile station. The mobile station, upon receiving the coefficients, evaluates the mathematical functions using the coefficients and a time of applicability (e.g., the current time), converts the evaluated result to a standard coordinate system, and applies the conversion result to the coarse orbit data to obtain the precise orbit data.

The method and system described herein provides a unique way of solving problems related to long-term satellite orbit data. Advantages of the method and system include smaller file size and smaller messages sent to a mobile station, as well as better accuracy in satellite positions and timing. A hybrid mode of operation is also introduced to enhance predictions of satellite positions and timing.

Other features of the present invention will be apparent from the accompanying drawings and from the detailed description which follows.

BRIEF DESCRIPTION OF THE DRAWINGS

The present invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Figure 1:
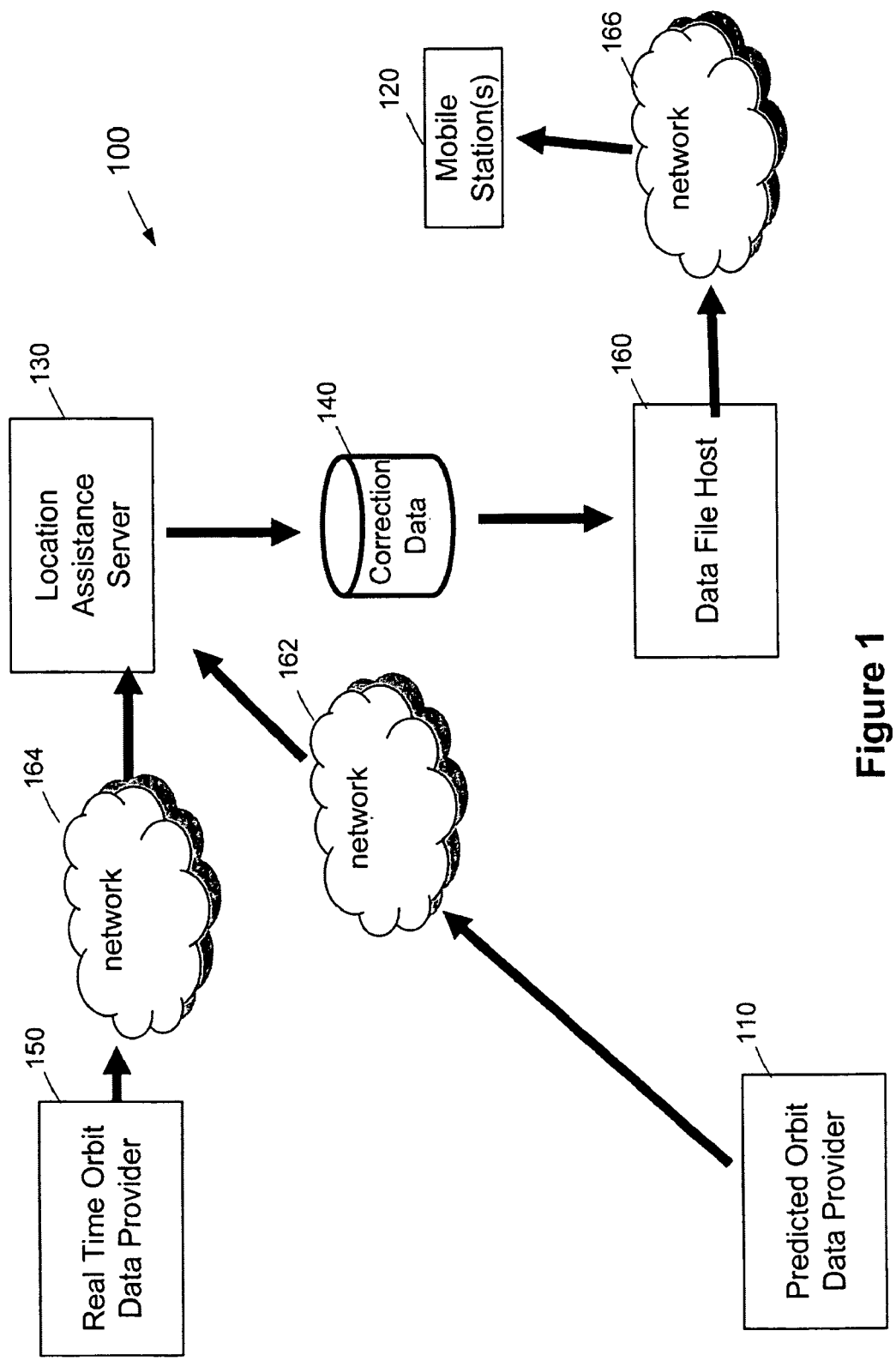
FIG. 1 is a diagram showing an example of a communication system including a server to assist a mobile station to locate a satellite.

A method and system for assisting mobile stations to determine satellite positions and satellite clock errors is described. The satellite positions and satellite clock errors are determined using an efficient messaging format containing extended SPS orbit correction information. The method and system described herein provides a unique way of solving problems related to long-term satellite orbit data. In one aspect of the invention, the method reduces file size and messages sent to a mobile station. The method also improves accuracy in the determination of satellite positions and timing at the mobile station. In another aspect of the invention, a hybrid mode of operation is introduced to enhance predictions of satellite positions and timing.

The number of bits required for supporting extended orbit and clock corrections is reduced significantly by using correction data calculated at a location assistance server and coarse orbit data received in a mobile station. The correction data is the difference between the satellite positions computed from a coarse representation of satellite orbit (for example, but not limited to, almanac) and those positions computed from predicted precise orbital data (e.g. orbital data which is of an extended duration in time—longer than that which can be obtained from the satellite vehicle, such as 6 hours or more). The correction data also includes the difference between the clock corrections computed from the coarse orbit data and those computed from predicted satellite clock data. These corrections generally vary in time and are unique to each satellite. However, with proper choice of a coordinate system, the variation can be relatively smooth. The corrections are then characterized by a mathematical function (for example, but not limited to, a polynomial) in time, with only the coefficients being provided to the mobile station by the location assistance server.

As used herein, a mobile station (MS) refers to a device such as a cellular or other wireless communication device, personal communication system (PCS) device, personal navigation device, laptop or other suitable mobile device capable of receiving and processing SPS signals. The term "mobile station" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also considered a "mobile station."

The term "coarse orbit data" herein refers to a coarse estimate of satellite position and clock data transmitted from a satellite, e.g., almanac. The term "real-time orbit data" refers to a precise representation of satellite positions and timing transmitted from a satellite, e.g., ephemeris. The term "predicted orbit data" or "precise orbit data" refers to a precise estimate of satellite position and timing that has a relatively extended period of validity compared to the real-time precise orbital data. The predicted orbit data is available at the location assistance server. However, transmitting the predicted orbit data to a mobile station generally uses a significant amount of bandwidth. Thus, transmitting the correction data, or an approximation thereof, often greatly increases the transmission efficiency.

FIG. 1 is a block diagram of a communication system 100 according to an aspect of the present invention. System 100 includes a location assistance server 130 communicatively coupled to one or more MSs 120. Location assistance server 130 receives coarse orbit data, as well as precise orbit data and/or predicted orbital parameter files containing predicted orbit data. In one scenario, location assistance server 130 receives predicted orbit data via a network 162 from a predicted orbit data provider 110. Network 162 can be a network that supports Internet Protocol (IP) connections (e.g., the Internet). Location assistance server 130 may include an interface, e.g., secure file transfer program (SFTP), for securely transferring the predicted orbit data from predicted orbit data provider 110.

In one aspect, predicted orbit data provider 110 generates predicted orbit data every several hours (e.g., 4 hours) to produce orbital data which is valid for an extended duration in time (e.g., 6 hours or more). Location assistance server 130 checks for new data at a shorter interval (e.g., every hour). Predicted orbit data may also include 3-D uncertainty values for predicted satellite coordinates, uncertainty of predicted satellite clock corrections, as well as an indication of predicted outages. Based on the uncertainty and outage information, a user range error (URE) may be computed by location assistance server 130 and provided to MS 120.

Location assistance server 130 receives coarse orbit data from a real-time orbit data provider 150 via a network 164. Real-time orbit data provider 150 may be a Global Reference Network (GRN) gateway or a Wide Area Reference Network (WARN) gateway that receives real-time satellite information including, but not limited to, packet-based SPS reference data, navigation messages, health page information, almanac, and ephemeris. In one scenario, network 164 is a network that supports IP connections, and location assistance server 130 may receive the real-time satellite information from real-time orbit data provider 150 in IP multicast messages.

Location assistance server 130 generates correction data 140 from the predicted orbit data and the coarse orbit data. Correction data 140 may be transmitted directly to MS 120 or to a storage location accessible by the MS. For example, correction data 140 may be stored in a storage device locally or remotely coupled to location assistance server 130. MS 120 may receive correction data 140 from data host 160 via a network 166 using a file transfer protocol, e.g., FTP, HTTP, or other suitable network protocols.

For the purpose of simplifying the discussion herein, the term "correction data" 140 refers to satellite orbital corrections that can be transmitted point-to-point, transferred in files, broadcast, or sent from one place to another by any means of data communications. The messages generated by location assistance server 130 have an efficient messaging format that allows MS 120 to determine the satellite positions and clock timing with a small number of bits over an extended time period. The messages provide MS 120 the information for correcting coarse orbit data so that the corrected satellite position is accurate to within a few meters.

In another aspect, location assistance server 130 may also provide estimated accuracy (User Range Error (URE)), ionospheric correction model, universal coordinated time (UTC) model, and satellite health/usability information to MS 120. This is to ensure the integrity of the satellite data, and to allow mobile operation without the need to receive and decode the data transmitted by the satellites over the air. This also ensures that MS 120 uses the coarse orbit data which is identical to that used by location assistance server 130.

It should be noted that the system described above is shown for illustration purposes only and other configurations may exist. For example, networks 162, 164, and 166 may alternatively be point-to-point connections, local area networks, wide area networks, broadcast networks, any suitable wired or wireless networks, computers or computer networks or combinations thereof that support data communication or file transfers.

One skilled in the art will see that the coarse orbit data which provides a coarse estimate of the satellite positions encompasses a broad range of forms. In the following description, a recent copy of the GPS broadcast almanac is suggested for use as the coarse estimate of the satellite positions and clock timing for ease in understanding the inventive concept. However, all of the following are illustrative of alternative coarse orbit data: an earlier copy of GPS broadcast ephemeris; recent copies of broadcast Galileo or GLONASS almanac or ephemeris; a non-broadcast coarse model of satellite positions which follows the same form as GPS, Galileo, or GLONASS almanac or ephemeris; any subset or enhancement of the Keplerian parameters used in GPS, Galileo, and GLONASS almanac and ephemeris formats; any non-Keplerian representations of satellite orbits; and other predicted orbit data which has degraded over time. It will also be understood that corresponding information pertaining to other satellite navigation systems can also be applied within the scope of the disclosed methodology. The present invention includes any and all methods of describing a coarse orbit. One skilled in the art will appreciate that the methodology applies no matter what form that coarse estimate takes.

In some scenarios, the coarse orbit data may be supplied by location assistance server 130 to MS 120. In addition to transmitting the coarse estimate of the satellite positions to MS 120, location assistance server 130 has the ability to include a reference time in the assistance message to the mobile station. In this aspect of the invention, location assistance server 130 obtains the reference time from a network time server, or from GPS data received from individual reference receivers (e.g., Wide Area Reference Network or Global Reference Network). This reference time information can be appended to the message that is transmitted to MS 120 which contains the coarse estimate of satellite positions. Location assistance server 130 may also implement algorithms which can improve the timing accuracy of the reference time provided by the network time server and transmit this more accurate time to MS 120.

It is to be noted that MS 120 can directly obtain the reference time, independent of location assistance server 130, from a packet switched data network that may or may not be synchronized to GPS time (e.g., a network time server or a CDMA communication network). In this manner, MS 120 obtains an estimate of a global time reference, for example, GPS time, Universal Coordinated Time (UTC) time, (WWO) time, etc.

Figure 2:
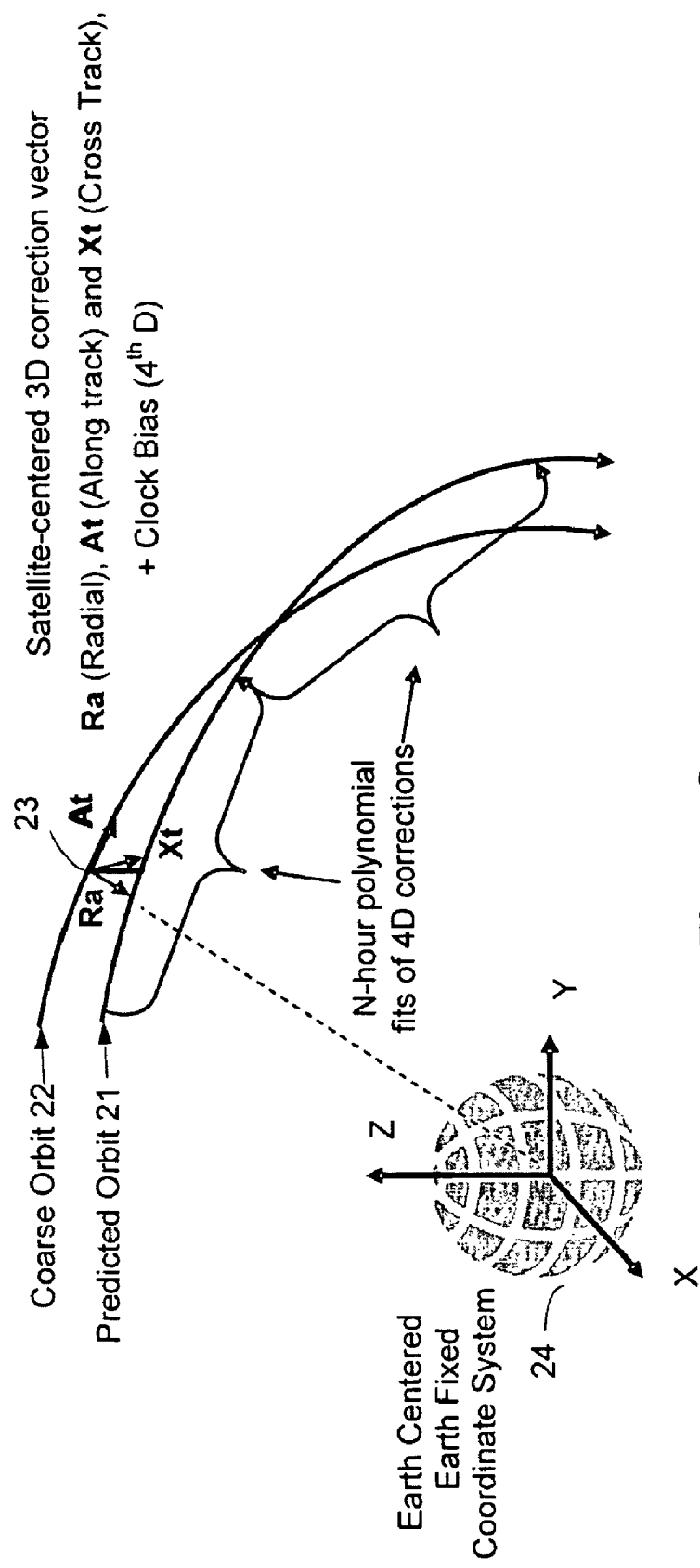
FIG. 2 is a diagram showing a coordinate system according to an aspect of the invention.

FIG. 2 shows an example of a coordinate system based on which correction data 140 is computed. Track 21 represents an actual satellite orbit track, which can be substantially estimated by precise orbit predictions. Track 22 represents an orbit track estimated by coarse orbit data, such as, but not limited to, the broadcast almanac. At any instant in time, there is a spatial difference between where the broadcast almanac says the satellite will be located and where the precise orbit predictions say it will be located. That difference can be encoded in a coordinate system 23, which is a coordinate system having an origin and axes that move with the body frame of the satellite. Expressed in orthogonal coordinate system 23, the "error signal," which is the difference between the precisely predicted satellite position and almanac-based satellite position, becomes substantially smooth curves. The variation of the error signal is substantially smooth in time such that there is no discontinuity or sharp turns in the error signal when represented as a function of time. In the embodiment of FIG. 1, the error signal constitutes correction data 140. The underlying technique of expressing the error signal in the chosen coordinate system effectively minimizes the order of the polynomials required to express these "error signals" to any given accuracy.

In one aspect, correction data 140 consists of four dimensions of information: three spatial dimensions (represented by the three axes of the coordinate system) to describe the satellite position error, and the time dimension (the $4^{th}$ dimension), which describes the clock correction of the satellite clock.

The three axes of coordinate system 23 are: Ra, which is a unit vector pointing from the coarse satellite position (e.g., satellite position determined from the broadcast almanac) to a reference location. As the reference location in typical situations is the center of the earth, this axis is interpreted as "radial." A skilled person in the art will appreciate that the reference location can be any location (e.g., inside, above, on or near the surface of the earth) that can be determined with reasonable accuracy.

Another axis is Xt: "cross track," which is defined as Xt=Ra×Vel/|Ra×Vel|. Vel is the almanac-based satellite velocity vector and "×" indicates a vector cross product. The Xt vector is, therefore, perpendicular to both the radial vector Ra and the direction of motion of the satellite.

The third axis is At: "along track," which is defined as At=Xt×Ra. The At vector is almost parallel to the satellite's velocity vector (Vel), but not quite. This is because the satellite's velocity vector is not exactly orthogonal to Ra due to orbital eccentricity (e.g., satellite orbit is elliptical by nature and not a circle). As the radius of the satellite orbit increases and decreases with time, satellite velocity vector Vel, in general, has a component along the radial direction Ra.

The three axes of coordinate system 23 defined above are a function of time since they depend on the instantaneous position of the satellite along its orbit. Among other motions, as the satellite orbits the earth, the radial vector Ra and along track vector At rotate through a full 360° when expressed in an Earth-Centered, Earth-Fixed (ECEF) XYZ coordinate system 24. Note that these axes are computed using the almanac-based estimate of satellite position. This allows the axes of coordinate system 23 to be calculated by location assistance server 130 before the almanac corrections are calculated. In the example of coordinate system 23, the order in which the axes are computed is essential for proper orientation of the coordinate system. Therefore, the radial vector Ra is computed first, cross track vector Xt is computed second and the along track vector At is computed last.

The axes orientation defined above are different for each satellite. One could write the unit vectors as Ra(PRN,t), At(PRN,t), Xt(PRN,t), and to make their dependence on satellite pseudorandom number (PRN) and t, which respectively index the satellites and the current time explicitly. However, for simplicity of the notations, these dependencies are left implicit in the following discussions.

Other coordinate systems may be employed for coarse orbit data corrections as well, such as, but not limited to, a radial/cross track/velocity coordinate system (different from the (Ra, At, Xt) described above); a 3-D ECEF XYZ coordinates system for differences, or arrange/elevation/azimuth (polar) coordinate system.

One skilled in the art will see that the (Ra, At, Xt) coordinate system (following the conventional left-hand rule) is illustrative and one preferred approach, but that a broad range of other axis systems is encompassed by the present invention. The salient feature of these axis systems is that they tend to have two spatial dimensions with significantly relaxed accuracy requirements compared to the third. In the example of (Ra, At, Xt,) coordinate system 23, At and Xt typically have a more relaxed accuracy requirement (e.g., 1/7) compared to Ra. The coordinate system can be orthogonal or non-orthogonal. A non-orthogonal coordinate system, for the purpose of coarse orbit data corrections, can be any axis system where one of the axes always makes a relatively shallow angle with respect to the Ra axis, even if it has a different origin than (Ra, At, Xt) coordinate system 23. This would include, for example, a coordinate system in which one axis is the Ra, but the other two axes are azimuth and elevation of the satellites, as well as any other choices for the other two axes.

Additionally, any axis system where some axis is parallel to a line drawn from some point near an estimate of the satellite location, to some point near the location of the receiver on the earth, falls within the scope of the present invention. Although FIG. 2 has illustrated the Ra axis pointing to the center of the earth, an axis which points towards any point near the receiver on the ground, or any other determinable reference location, falls within the scope of the present invention.

Further, the location of the origin of (Ra, At, Xt) coordinate system 23 can be modified within the scope of the invention. An origin at the satellite location is a matter of mathematical convenience. In particular, an origin defined to be at the actual or precisely predicted satellite location (as opposed to at an estimate of the satellite location as in (Ra, At, Xt) coordinate system 23) is within the scope of the invention.

Over a predetermined period of time (e.g., a 6-hour period), each of the three spatial dimensions of the correction data can be expressed as a function of time in the chosen coordinate system, such as (Ra, At, Xt) coordinate system 23. Theoretically, the correction data can be precisely represented by polynomials of an infinite order. However, in practice, the correction data can be approximated by polynomials of relatively low order, e.g., $6^{th}$, $7^{th}$, or other lower order. Thus, a large number of the polynomial terms and associated coefficients are truncated; only a small fractional portion of the polynomial terms and associated coefficients are used as an approximate to the correction data. In addition to spatial corrections, a low order (e.g., a first order or any suitable low order) polynomial may be used to describe the clock correction parameters that represent an approximation of the difference between the clock timing in the coarse obit data and the predicted clock bias. Other accurate clock predictions that are available at location assistance server 130 may also be used as the predicted clock bias, such as the clock information in real-time orbit data if available.

One skilled in the art will see that the present invention comprises expanding the correction data in a series of functions, with the possibility of increasing accuracy in the expansion as more functions are used. It is not necessary that the series of functions be increasing powers of x so that the correction data is represented as a polynomial. One skilled in the art will see that the data corrections could also be expanded across other series of functions, including harmonics, Hermite polynomials, Legendre polynomials, cosine and sine functions (Fourier expansion), and the coefficients of Keplerian orbital functions. This list is illustrative, not exhaustive. Expanding the correction data in any set of functions is within the scope of the invention.

The four spatial and temporal sets of polynomial coefficients are sent to MS 120, along with information to associate these coefficients with a particular satellite, a particular time interval, and a particular copy of coarse orbit data. MS 120 receives a new copy of coarse orbit data at a predetermined interval (e.g., about once per week or other suitable time intervals). Location assistance server 130 calculates the correction data using the same version of the coarse orbit data as the version to be used by MS 120. Thus, MS 120 can either use coarse orbit data that it has acquired or that which is transmitted by location assistance server 130, so long as the correction data is applied to the corresponding coarse orbit data that location assistance server 130 used in determining the corrections.

Figure 3:
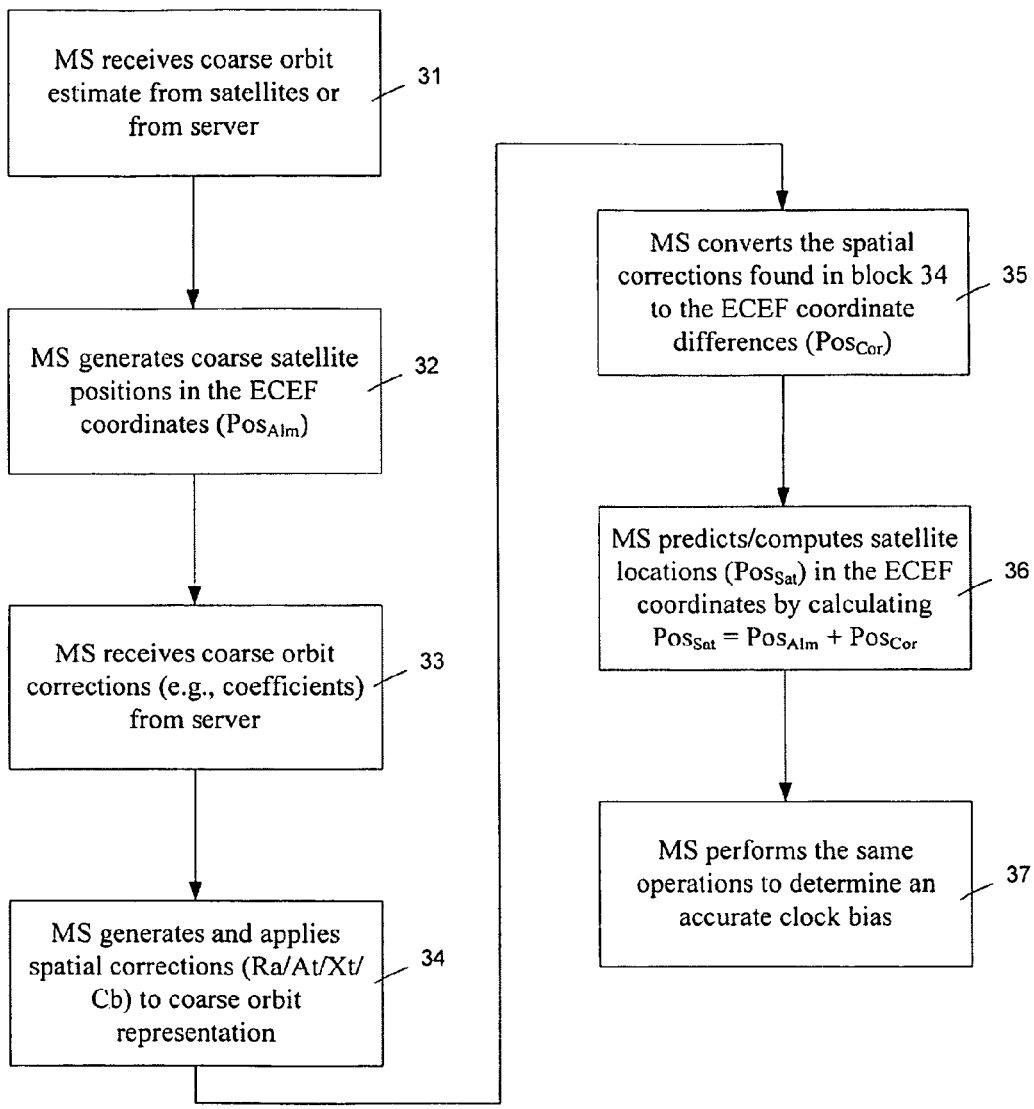
FIG. 3 is a flowchart showing an example of a method performed by a mobile station.

FIG. 3 shows an example of the operations performed by MS 120. Note that processes as shown in FIG. 3 may be performed by processing logic, which may include software, hardware, or a combination of both. Once MS 120 has the polynomial coefficients and time of applicability, the mobile can reconstruct accurate predictions of satellite position and clock bias. For any particular time during the period of applicability of the coefficients, MS 120 can find the satellite position and clock bias within a pre-determined accuracy range.

At block 31, MS 120 receives coarse orbit data (e.g. almanac data) from the satellites in view or from the location assistance server 130. It will often be preferable and more efficient for MS 120 to receive the coarse orbit data from location assistance server 130 as it can take many minutes to download such data from satellites. Location assistance server 130 may provide the coarse orbit data in the message/file to MS 120 together with the correction data. It is understood that the "correction data" referred to at MS 120 may be an approximation to the correction computed at location assistance server 130. At block 32, MS 120 generates satellite positions in the ECEF coordinates using its copy of the coarse orbit data. The satellite positions computed from the coarse orbit data and represented in a standard coordinate system, such as the ECEF coordinates, are referred to as $Pos_{Alm}$ (here, the subscript "alm," which stands for "almanac," is used as an example of the coarse orbit data). At block 33, MS 120 receives coefficients of one or more series of mathematical functions from location assistance server 130. At block 34, MS 120 reconstructs the spatial correction data to the coarse orbit data for a time of applicability (e.g., the current time) by evaluating the mathematical functions for the current time using the coefficients it has received. At block 35, MS 120 converts the spatial corrections found in block 34 from a coordinate system (e.g., (Ra, At, Xt) coordinate system 23 of FIG. 2) to the ECEF coordinates. The converted corrections are referred to as $Pos_{Cor}$. Subsequently, at block 36, MS 120 computes satellite locations ($Pos_{Sat}$) in the ECEF coordinates by calculating $Pos_{Sat}=POS_{Alm}+POS_{Cor}$. At block 37, MS 120 performs the same operations in blocks 34 and 36 to determine an accurate clock bias. It is understood that the mobile operations may occur in a different order from the descriptions above, and additional operations may also be performed. For example, at block 36, instead of calculating $Pos_{Sat}=Pos_{Alm}+Pos_{Cor}$, MS 120 may choose to apply $Pos_{Cor}$ in the range space $R_{Sat}=R_{Alm}+R_{Cor}$, where R represents the computed distance from MS 120 to the satellite.

Figure 4:
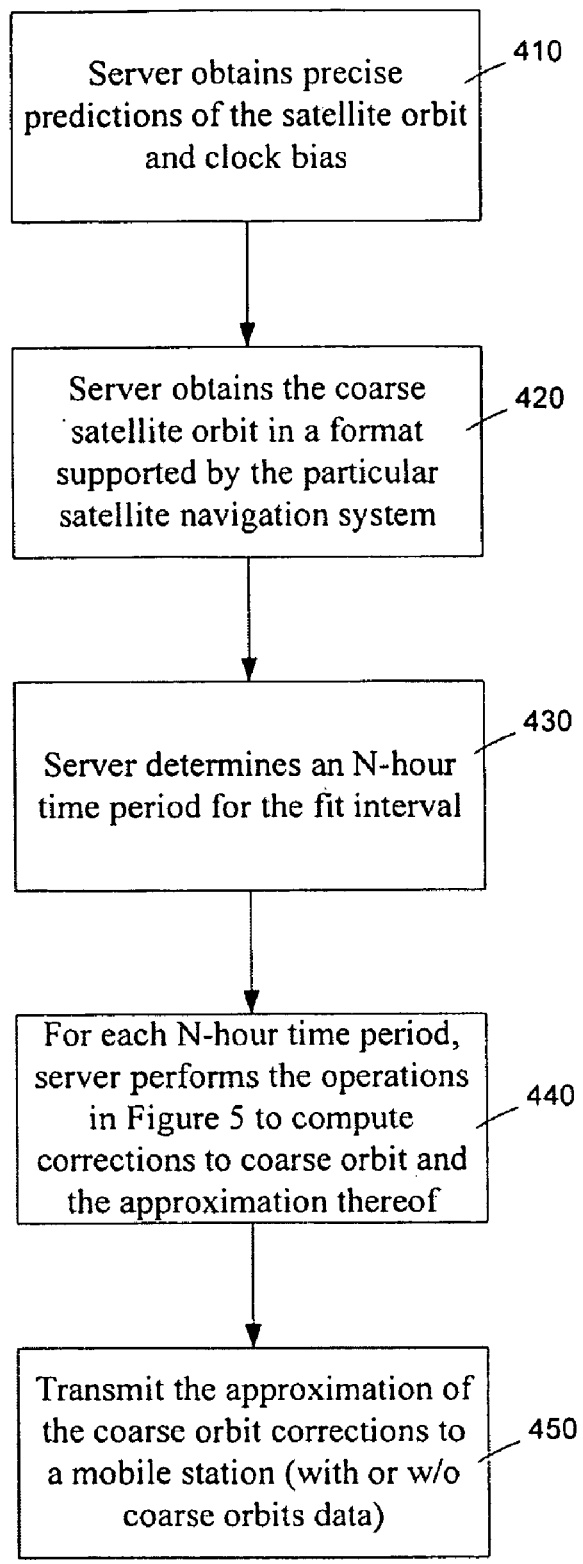
FIG. 4 is a flowchart showing an example of a method performed by a server.

FIG. 4 shows an example of the operations performed by location assistance server 130. Note that processes as shown in FIG. 4 may be performed by processing logic, which may include software, hardware, or a combination of both. Location assistance server 130 calculates the polynomial coefficients that describe the correction data in the following operations.

At block 410, location assistance server 130 obtains precise orbit data for satellite orbits and clock bias, e.g., from satellite broadcast signals or from an external data provider. The precise orbital data is valid for a pre-determined validity period. At block 420, location assistance server 130 obtains the coarse orbit data in a format supported by the particular satellite navigation system. At block 430, location assistance server 130 determines whether to divide the validity period into multiple N-hour fit intervals, or use the entire validity period as one fit interval. A fit interval herein refers to a time period for which polynomial coefficients are computed to describe the correction data of that time period. An example of a fit interval is 4-6 hours, although other time periods may also be used. If location assistance server 130 has the precise orbit data with an extended validity period, the location assistance server may divide the precise orbit data into a plurality of fit intervals to improve the accuracy of the fits. At block 440, for each N-hour fit interval, location assistance server 130 performs the operations described below in FIG. 5 to compute correction data and the approximation thereof. At block 450, location assistance server 130 transmits the approximation of the correction data to MS 120.

Figure 5:
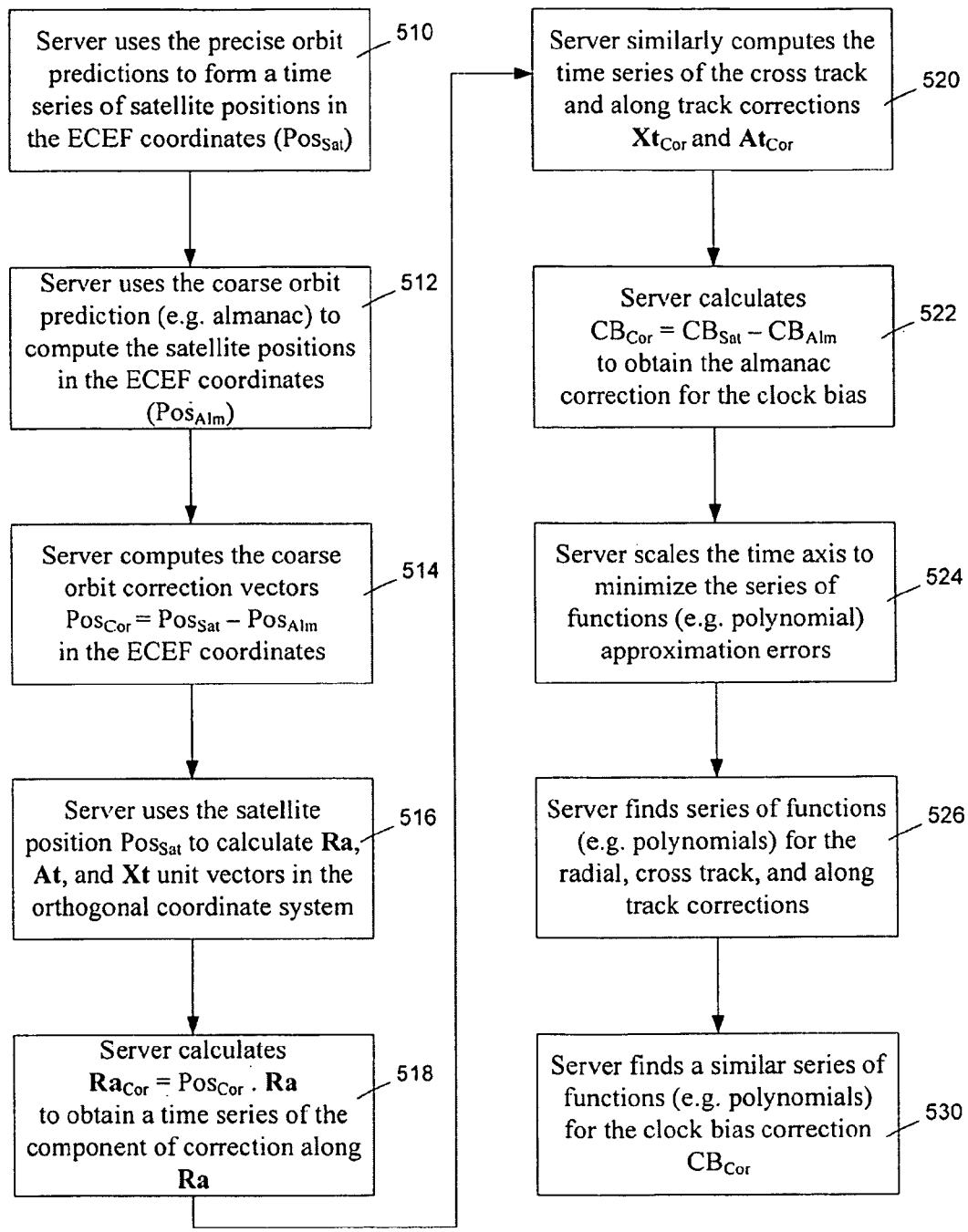
FIG. 5 is a flowchart showing further details of the method of FIG. 4.

Referring to FIG. 5, at block 510, location assistance server 130 uses the precise orbit data to form a time series of satellite positions in the ECEF coordinates. These satellite positions are defined as $Pos_{Sat}$. At block 512, location assistance server 130 uses the coarse orbit data to compute the satellite positions in the ECEF coordinates. These satellite positions are defined as $Pos_{Alm}$. At block 514, location assistance server 130 calculates the correction data vectors ($Pos_{Cor}$) in the ECEF coordinates by computing $Pos_{Cor}=Pos_{Sat}-Pos_{Alm}$. At block 516, location assistance server 130 uses the satellite position $Pos_{Sat}$ to calculate Ra, Xt, and At unit vectors in the orthogonal coordinate system 23, or other coordinate systems as described above. At block 518, the time series of the component of correction along the radial axis Ra is obtained by calculating the dot product: $Ra_{Cor}=Pos_{Cor}\cdot Ra$. At block 520, the time series of the cross track and along track corrections $Xt_{Cor}$ and $At_{Cor}$ are similarly calculated. At block 522, the correction data for the clock bias is calculated as $CB_{Cor}=CB_{Sat}-CB_{Alm}$, where $CB_{Sat}$ and $CB_{Alm}$ are the clock corrections using the precise clock model and the coarse estimate of the clock model, respectively.

At block 524, location assistance server 130 may scale and/or normalize the time axis of the polynomial interpolation to enhance the performance of the interpolation. Location assistance server 130 and MS 120 are expected to use the same scaling and/or normalization factors in order to properly reconstruct the correction data in the mobile software.

At block 526, location assistance server 130 finds polynomial coefficients for interpolating the radial, along track, and cross track corrections $Ra_{Cor}$, $At_{Cor}$, and $Xt_{Cor}$. The polynomial coefficients ($Ra_0, Ra_1, \ldots Ra_j$) for $Ra_{Cor}$ are chosen such that $Ra_0 f_0(d)+Ra_1 f_1(d)+ \ldots +Ra_j f_j(d)$ is a good approximation to $Ra_{Cor}$, where d is the correction data point, and $f_0$, $f_1, \ldots f_j$ are the interpolating functions. The coefficients may be chosen so that the polynomial approximates $Ra_{Cor}$ with a minimum mean square error. Location assistance server 130 similarly finds polynomial coefficients for $Xt_{Cor}$ and $At_{Cor}$ such that these coefficients $Xt_0$, $Xt_1$, $Xt_2 \ldots Xt_k$, $At_0$, $At_1, \ldots , At_m$ provide good approximations to $Xt_{Cor}$, and $At_{Cor}$. Finally, at block 530, location assistance server 130 finds the coefficients of the interpolating functions for the clock bias correction $CB_{Cor}$. It is understood that the number of coefficient terms for representing the corrections in each of the spatial and time dimensions may be not the same. More coefficients for a dimension generally correspond to a higher accuracy in the representation of the correction data in that dimension.

The operations of blocks 510-530 are repeated if there are multiple N-hour fit intervals for the validity period. The order of operations may differ from the descriptions above and additional operations may be included.

The correction data generated by location assistance server 130 of FIG. 1 may be global or local. When the location of MS 120 is completely unknown or the location cannot be estimated within an accuracy of a few hundred kilometers, location assistance server 130 generates a global message for the MS. Global messages can be sent to mobile stations anywhere on Earth for producing accurate satellite positions. Local messages are briefer, but they are only accurate within a few hundred kilometers radius of some intended reference point on the surface of the Earth. Thus, the shorter local messages may be sent when the mobile position is known ahead of time to within a few hundred kilometers. When the location of the mobile station is unknown, global messages may be sent to the mobile station. The difference between a global message and a local message is described below.

A global message uses the center of the Earth as the reference location of the (Ra, At, Xt,) coordinate system. As almanac errors have four independent dimensions (three spatial dimensions and clock bias), the global message includes four polynomials, three to fit orthogonal spatial components of the satellite position error, and the fourth polynomial to describe a more accurate clock bias.

A local message uses a point on the Earth's surface as the reference location of the (Ra, At, Xt) coordinate system. Typically, location assistance server 130 uses an estimate of the mobile station's current location as the reference location (e.g., the location of a cellular tower with which the mobile is communicating). The local message contains a single polynomial fit to the correction. The one-dimensional correction includes both the correction to the spatial range to the satellite (also referred to as the pseudorange), as well as the correction for the clock bias. As only one polynomial is sent, the local message is significantly shorter than the global message.

The pseudorange correction is calculated for a reference location which ideally is as close to where the mobile station is actually located as possible. As long as the mobile is within about 100 km of the estimated reference location, the positioning result is quite accurate. Accuracy degrades slowly as the mobile's true position diverges further than 100 km from the estimated reference location. The mobile can determine its positioning accuracy degradation by first calculating its location and then comparing that to the reference location of the correction data.

In another aspect, MS 120 of FIG. 1 may use a combination of orbit data to determine satellite positions and clocks. In some scenarios, MS 120 receives real-time orbit data (e.g. ephemeris) in addition to the correction data. For a single satellite, MS 120 may use real-time orbit data for one time period, corrected orbit data (which comprises the correction data applied to the coarse orbit data) for another time period, and a combination (e.g., a weighted average) of both for yet another time period. To determine its location from multiple satellites, MS 120 may use real-time orbit data for one satellite, corrected orbit data for another satellite, and a combination of both for yet another satellite. A skilled person will appreciate that the various combinations described above are illustrative only. Any combination, in time or of different satellites, of real-time orbit data and corrected orbit data can be used by MS 120.

In one aspect, MS 120 may use real-time orbit data decoded from satellites whenever the real-time orbit data is available. Real-time orbit data is generally more accurate than the earlier predicted orbit data, which may gradually degrades over a period of time. Thus, the corrected orbit data, which approximates the predicted orbit data, also gradually degrade over time. Also, real-time orbit data may contain new information about the satellites not known at the time of predictions (e.g. satellite health and integrity information). However, real-time orbit data is sometimes not available to MS 120 due to lack of line of sight, shadowing, or other reception problems that prevents MS 120 from receiving satellite broadcasts. When the real-time orbit data is not available, MS 120 may switch to the correction data, as described in FIGS. 2-5 above, for locating the satellites. Thus, MS 120 may utilize the corrected orbit data for a time period and the real-time orbit data for another time period, depending on the availability of the real-time orbit data. To determine its own position at any time instant, MS 120 may utilize the corrected orbit data of one or more satellites and the real-time orbit data of one or more other satellites.

The preceding paragraph described a case when the corrected orbit data may be replaced with available real-time orbit data for the duration of validity of the real-time orbit data. For example, after the ephemeris is no longer valid (+/−2 hours from Time of Ephemeris, i.e. TOE), MS 120 may switch back to the corrected orbit data. Alternatively, the real-time orbit data of an earlier time period can be used to improve the accuracy of the corrected orbit data. For example, MS 120 may use real-time orbit data to determine the amount of adjustment applied to a future time period of the corrected orbit data, which can be used when the real-time orbit data is not available (or invalid). This is especially beneficial for satellite clocks, because clock timing is generally not as predictable as the satellite trajectory. In a simple case, the corrected satellite vehicle clocks can be evaluated against the real-time broadcast satellite clock parameters (e.g. from subframe 1 of GPS navigation) to determine the amount of adjustment for the corrected clocks. The adjustment (for example, including differential offset and slope) can be applied to corrected clock information for use when the real-time clock is unavailable. In an enhanced case, the adjustment can be made to the entire corrected orbit data, including satellite positions in three spatial dimensions and satellite clocks.

Furthermore, real-time orbit data and predicted orbit data can be weighed according to their accuracy estimates. MS 120 may appropriately weigh the participating satellite measurements in the solution for its position and account for the degraded accuracy of predicted data. The accuracy estimates for the real-time orbit data and the predicted orbit data are referred to as "error estimate of precise or short term predicted data" and "error estimate of long term predicted data," respectively. For example, almanac contains an uncertainty estimate in the form of URE (computed or provided by location assistance server 13), and real-time ephemeris data contains an uncertainty estimate in the form of URA (User Accuracy Range, as provided, for example, by GPS control segment). URA is usually a couple of meters, and the URE may be tens of meters after a couple of days. For example, both error estimates can be used as weights in a weighted least squares (WLS) model. The weights may be computed as: $W_{(short\ term\ predicted\ orbit)} = 1/URA^2$ and $W_{(long\ term\ predicted\ orbit)} = 1/URE^2$.

Specifically, satellite measurements with smaller satellite position errors (represented by URA in the above example) are weighted higher than satellite measurements with larger predicted satellite position errors (represented by URE in the above example). Satellite measurements with respect to position, velocity, time solution, or any combination of position/velocity/time solution can be weighted. The weighted position/velocity/time solution can be computed from satellite measurements by a Weighted Least Squares model (WLS) or a Kalman filter, or some other linear, linearized or non-linear estimation method.

At MS 120, during position/velocity/time computations, to compute the overall measurement errors, the error estimates of satellite positioning errors (either real time ephemeris (URA) or predicted orbit errors (URE)) are combined with measured pseudorange errors (due to signal strength, atmosphere, quantization, RF to digital conversion, etc.). In other words, at MS 120, the overall pseudorange error:

Variance_total_meas_error=variance_satellite_positioning_error+variance_meas_error.

Furthermore, when MS 120 uses a mix of real-time and predicted orbit information from multiple satellites to determine its own location, an extra satellite measurement can be used to solve the predicted satellite clock error. This extra satellite measurement can be the real-time orbit data of a satellite and can be used to estimate the predicted clock error of the same satellite. Alternatively, this extra satellite measurement can be the real-time orbit data of a first satellite and can be used to estimate the predicted clock error of a second satellite. The predicted clock error can be removed from the corrected clock to improve the accuracy of the corrected clock computed at the mobile. This way the real-time orbit data and satellite clock correction data can be used to effect a real-time adjustment of the predicted satellite clock information.

Since the predicted satellite clock degrades faster than the predicted satellite positions, the extra satellite measurement can be used together with the predicted satellite positions to compute the predicted satellite clock errors and make adjustments to the predicted clock for future use. Similarly, if current real-time orbit data is available for at least one extra satellite in view, then this real-time data can be used together with this satellite's pseudorange and range-rate measurements to compute the predicted satellite clock error of another in-view satellite. For a 2-dimensional position estimate (some altitude knowledge is available), at least four in-view satellites would be needed to estimate the predicted satellite clock error for one satellite. For a 3-dimensional position estimate, at least five in-view satellites would be needed to estimate the predicted satellite clock error for one satellite. Every extra satellite can be used to estimate yet another predicted satellite clock error. In a 3-dimensional case (with 4 unknowns), for example, if measurements from 7 satellites are available, predicted satellite clock errors can be estimated for three satellites.

Figures 6A, 6B:
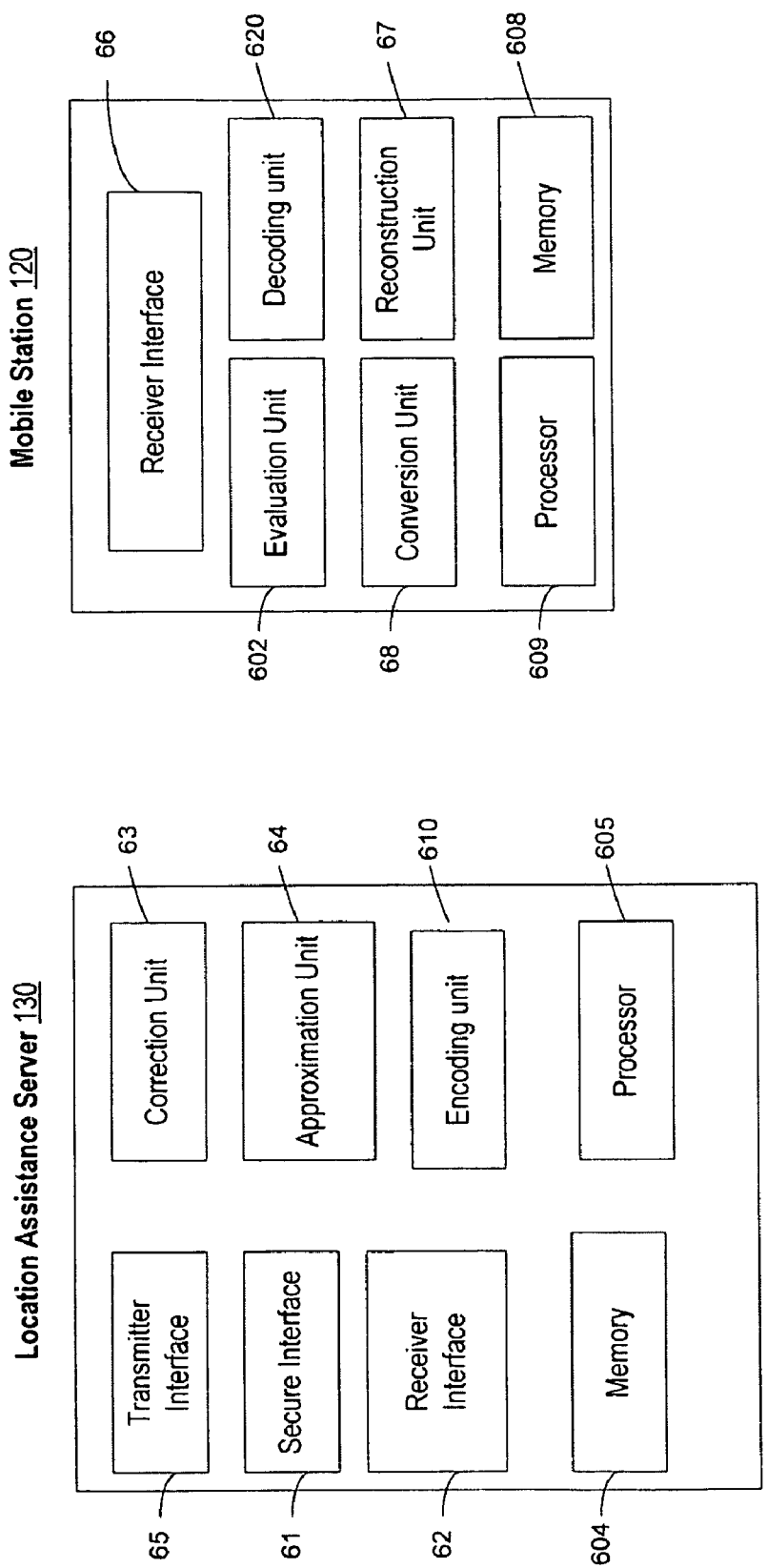
FIG. 6A is a block diagram showing an example of components in a location assistance server.
FIG. 6B is a block diagram showing an example of components in a mobile station.

FIG. 6A shows an example of a block diagram of location assistance server 130 of FIG. 1. Location assistance server 130 includes a memory 604 and a processor 605. Location assistance server 130 also includes secure interface 61 for securely receiving the predicted orbit data from an external data provider, a receiver interface 62 for receiving broadcast data (e.g., almanac) as well as information transmitted over a network (e.g., predicted orbit data), and a transmitter interface 65 for transmitting the coefficients to MS 120 for determination of the predicted satellite orbit data. Transmitter interface 65 may transmit the coefficients via wired or wireless networks, broadcast medium, or any suitable data transmission means.

In one scenario, location assistance server 130 may also include a correction unit 63 for computing the differences ("correction") between coarse orbit data and predicted orbit data. Location assistance server 130 may also include an approximation unit 64 for computing an approximation of the correction using a coordinate system that is chosen such that variation of the correction is substantially smooth over time (e.g., (Ra, At, Xt) coordinate system 23 of FIG. 2). In one scenario, the approximation is computed by interpolating the correction data points using one or more low-order mathematical functions. An encoding unit 610 encodes the approximation for transmission to MS 120.

FIG. 6B provides an example of a block diagram of components of MS 120. MS 120 includes a memory 608 and a processor 609. MS 120 also includes a receiver interface 66 for receiving the coefficient sequences from location assistance server 130. Receiver interface 66 also receives coarse orbit data and/or real-time orbit data, e.g., almanac, ephemeris, and/or other satellite position and timing information, from satellite broadcasts, from location assistance server 130, or from other data sources. Receiver interface 66 may receive the coefficients via wired or wireless networks, broadcast medium, or any suitable data transmission means. MS 120 includes a decoding unit 620 to decode the coefficient sequences sent from location assistance server 130. In one scenario, MS 120 may also include an evaluating unit 602, a conversion unit 68 and a reconstruction unit 67. Evaluating unit 602 evaluates the mathematical functions using the coefficients and a time of applicability (e.g., the current time). Conversion unit 68 converts the evaluated result from a coordinate system used by location assistance server 130 (e.g., (Ra, At, Xt) coordinate system 23 of FIG. 2) to the ECEF coordinate system. Reconstruction unit 67 then reconstructs the predicted orbit data by applying the conversion result to the coarse orbit data.

The methodologies described herein may be implemented by various means depending upon the application. For example, the above components of location assistance server 130 and MS 120 may be implemented in hardware, firmware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, referring back to FIGS. 6A and 6B, software codes may be stored in a memory (e.g., memory 604 of location assistance server 130 and memory 608 of MS 120) and executed by a processor (e.g., processor 605 of the location assistance server and processor 609 of MS 120). Memory may be implemented within the processor or external to the processor. As used herein the term "memory" refers to any type of long-term, short-term, volatile, nonvolatile, or other memory and is not to be limited to any particular type of memory or number of memories, or type of media upon which memory is stored.

The method and apparatus described herein may be used with various satellite positioning systems (SPS) or global navigation satellite system (GNSS), such as but not limited, to the United States Global Positioning System (GPS), the Russian Glonass system, the European Galileo system, any system that uses satellites from a combination of satellite systems, or any satellite system developed in the future. Furthermore, the disclosed method and apparatus may be used with positioning determination systems that utilize pseudolites or a combination of satellites and pseudolites. Pseudolites are ground-based transmitters that broadcast a PN code or other ranging code (similar to a GPS or CDMA cellular signal) modulated on an L-band (or other frequency) carrier signal, which may be synchronized with GPS time. Each such transmitter may be assigned a unique PN code so as to permit identification by a remote receiver. Pseudolites are useful in situations where GPS signals from an orbiting satellite might be unavailable, such as in tunnels, mines, buildings, urban canyons or other enclosed areas. Another implementation of pseudolites is known as radio-beacons. The term "satellite", as used herein, is intended to include pseudolites, equivalents of pseudolites, and possibly others. The term "SPS signals," as used herein, is intended to include SPS-like signals from pseudolites or equivalents of pseudolites.

Position determination techniques described herein may be used for various wireless communication networks, such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). CDMA2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be used for any combination of WWAN, WLAN and/or WPAN.

Although the present invention has been described with reference to specific exemplary features, it will be evident that various modifications and changes may be made to these features without departing from the broader spirit and scope of the invention as set forth in the claims. Accordingly, the specification and drawings are to be regarded in an illustrative rather than restrictive sense.

What is claimed is:

1. A method of a mobile station, comprising:
   estimating predicted orbit data of a second satellite at least in part by applying correction information received at the mobile station to previous orbit data for the second satellite stored at the mobile station, wherein the correction information is represented by one or more coefficients of one or more polynomials;
   combining real-time orbit data of a first satellite and the predicted orbit data of the second satellite at least in part to determine an estimated location for the mobile station;
   switching from the real-time orbit data of the first satellite to predicted orbit data of the first satellite in response to the real-time orbit data of the first satellite becoming unavailable;
   interpolating the real-time data of the first satellite and the predicted orbit data of the first satellite to smooth a transition between the real-time data and the predicted orbit data; and
   using the predicted orbit data of the first satellite at least in part to determine the estimated location for the mobile station.

2. The method of claim 1, further comprising receiving said correction information from a server.

3. The method of claim 1, wherein the previous orbit data for the second satellite comprises coarse orbit data.

4. The method of claim 1, further comprising:
   using the real-time orbit data of the first satellite in an earlier time period to correct an error of a clock bias in the predicted orbit data of the first satellite in a later time period.

5. The method of claim 1, further comprising:
   switching from the predicted orbit data of the second satellite to real-time orbit data of the second satellite in response to the real-time orbit data of the second satellite becoming available; and
   using the real-time orbit data of the second satellite at least in part to determine the estimated location for the mobile station.

6. The method of claim 1, further comprising:
   monitoring an age of the real-time orbit data of the first satellite, the age indicated by a time to Time of Ephemeris (TOE); and
   switching from the real-time orbit data of the first satellite to the predicted orbit data of the first satellite in response to the age of the real-time orbit data exceeding a predetermined threshold.

7. A system of a mobile station, comprising:
   a processor to estimate predicted orbit data of a second satellite at least in part by applying correction information received at the mobile station to previous orbit data for the second satellite stored in a memory of the mobile station, wherein the correction information is represented by one or more coefficients of one or more polynomials; and
   a combining unit to combine real-time orbit data of a first satellite with the predicted orbit data of the second satellite at least in part to determine an estimated location for the mobile station, the combining unit further to switch from the real-time orbit data of the first satellite to predicted orbit data of the first satellite in response to the real-time orbit data of the first satellite becoming unavailable, to interpolate the real-time data of the first satellite and the predicted orbit data of the first satellite to smooth a transition between the real-time data and the predicted orbit data, and to use the predicted orbit data of the first satellite at least in part to determine the estimated location for the mobile station.

8. The system of claim 7, the combining unit to use real-time orbit data of a third satellite in place of the predicted orbit data of the second satellite to determine the estimated location of the mobile station at least in part in response to the real-time orbit data of the third satellite becoming available.

9. A mobile station, comprising:
means for estimating predicted orbit data of a second satellite at least in part by applying correction information received at the mobile station to previous orbit data for the second satellite stored at the mobile station, wherein the correction information is represented by one or more coefficients of one or more polynomials;
means for combining real-time orbit data of a first satellite and the predicted orbit data of the second satellite at least in part to determine an estimated location for the mobile station;
means for switching from the real-time orbit data of the first satellite to predicted orbit data of the first satellite in response to the real-time orbit data of the first satellite becoming unavailable;
means for interpolating the real-time data of the first satellite and the predicted orbit data of the first satellite to smooth a transition between the real-time data and the predicted orbit data; and
means for using the predicted orbit data of the first satellite at least in part to determine the estimated location for the mobile station.

10. The mobile station of claim 9, further comprising:
means for switching from the predicted orbit data of the second satellite to real-time orbit data of the second satellite at least in part in response to the real-time orbit data of the second satellite becoming available; and
means for using the real-time orbit data of the second satellite at least in part to determine the estimated location for the mobile station.

11. An article, comprising: a non-transient machine-readable medium having stored thereon instructions executable by a processor of a mobile station to:
estimate predicted orbit data of a second satellite at least in part by applying correction information received at the mobile station to previous orbit data of the second satellite stored at the mobile station, wherein the correction information is represented by one or more coefficients of one or more polynomials;
combine real-time orbit data of a first satellite and the predicted orbit data of the second satellite at least in part to determine an estimated location for the mobile station;
switch from the real-time orbit data of the first satellite to predicted orbit data of the first satellite in response to the real-time orbit data of the first satellite becoming unavailable;
interpolate the real-time data of the first satellite and the predicted orbit data of the first satellite to smooth a transition between the real-time data and the predicted orbit data; and
determine the estimated location for the mobile station at least in part by using the predicted orbit data of the first satellite.

12. The article of claim 11, wherein the non-transient machine-readable medium has stored thereon further instructions executable by the processor to correct an error of a clock bias in the predicted orbit data of the first satellite in a later time period using the real-time orbit data of the first satellite in an earlier time period.

* * * * *